United States Patent
Chen et al.

(10) Patent No.: US 10,664,239 B2
(45) Date of Patent: May 26, 2020

(54) METHOD OF PROGRAMMING NONVOLATILE MEMORY CELL

(71) Applicant: eMemory Technology Inc., Hsinchu (TW)

(72) Inventors: Kuan-Hsun Chen, Tainan (TW); Chun-Hung Lu, Hsinchu (TW); Ming-Shan Lo, Hsinchu (TW)

(73) Assignee: eMemory Technology Inc., Hsinchu (TW)

( * ) Notice: Subject to any disclaimer, the term of this patent is extended or adjusted under 35 U.S.C. 154(b) by 0 days.

(21) Appl. No.: 16/125,779

(22) Filed: Sep. 10, 2018

(65) Prior Publication Data

US 2019/0080778 A1    Mar. 14, 2019

Related U.S. Application Data

(60) Provisional application No. 62/557,170, filed on Sep. 12, 2017.

(51) Int. Cl.
| | |
|---|---|
| *G11C 7/06* | (2006.01) |
| *G11C 17/16* | (2006.01) |
| *G06F 7/58* | (2006.01) |
| *H04L 9/32* | (2006.01) |
| *G06F 21/86* | (2013.01) |
| *H04L 9/08* | (2006.01) |

(Continued)

(52) U.S. Cl.
CPC .............. *G06F 7/588* (2013.01); *G06F 21/86* (2013.01); *G09C 1/00* (2013.01); *G11C 7/062* (2013.01); *G11C 17/16* (2013.01); *G11C 17/18* (2013.01); *H01L 27/11206* (2013.01); *H03K 3/84* (2013.01); *H04L 9/0866* (2013.01); *H04L 9/0869* (2013.01); *H04L 9/3278* (2013.01); *H03K 19/21* (2013.01); *H04L 2209/12* (2013.01)

(58) Field of Classification Search
CPC ........... G06F 7/588; G06F 21/86; G09C 1/00; G11C 7/062; G11C 17/16
USPC ......................................................... 365/96
See application file for complete search history.

(56) References Cited

U.S. PATENT DOCUMENTS

| | | | |
|---|---|---|---|
| 6,292,394 | B1 | 9/2001 | Cohen et al. |
| 7,548,457 | B2 | 6/2009 | Kang et al. |

(Continued)

FOREIGN PATENT DOCUMENTS

| | | |
|---|---|---|
| KR | 101161429 | 7/2012 |
| TW | 200536109 | 11/2005 |
| TW | 200540872 | 12/2005 |

OTHER PUBLICATIONS

"Office Action of Taiwan Counterpart Application", dated May 7, 2019, pp. 1-5.

*Primary Examiner* — Anthan Tran
(74) *Attorney, Agent, or Firm* — JCIPRNET

(57) ABSTRACT

A method of programming a nonvolatile memory cell is provided according to an embodiment of the invention. The nonvolatile memory cell includes a substrate; and a select transistor, a following gate transistor, and an anti-fuse transistor comprising a first gate oxide layer, disposed on the substrate and coupled in series with each other. The programming method includes applying to said nonvolatile memory cell a variable DC voltage source comprising at least one high voltage part for forming a trapping path within the first gate oxide layer and at least one low voltage part for crystallizing the trapping path into a silicon filament.

6 Claims, 1 Drawing Sheet

(51) Int. Cl.
*G09C 1/00* (2006.01)
*H03K 3/84* (2006.01)
*G11C 17/18* (2006.01)
*H01L 27/112* (2006.01)
*H03K 19/21* (2006.01)

(56) References Cited

U.S. PATENT DOCUMENTS

| | | |
|---|---|---|
| 7,675,782 B2 | 3/2010 | Cohen et al. |
| 9,779,832 B1 | 10/2017 | Masuduzzaman et al. |
| 2008/0042235 A1* | 2/2008 | Kodama ................ G11C 17/16 257/530 |
| 2009/0262565 A1* | 10/2009 | Shin ....................... G11C 17/18 365/94 |
| 2014/0340955 A1* | 11/2014 | Wu ................... H01L 27/11206 365/104 |
| 2017/0200508 A1* | 7/2017 | Grigoriev ................ G11C 7/24 |

* cited by examiner

METHOD OF PROGRAMMING NONVOLATILE MEMORY CELL

CROSS-REFERENCE TO RELATED APPLICATION

This application claims the priority benefit of U.S. provisional application Ser. No. 62/557,170, filed on Sep. 12, 2017. The entirety of the above-mentioned patent application is hereby incorporated by reference herein and made a part of this specification.

BACKGROUND

Technical Field

The present invention relates to a method of programming an electronic device, and more particularly, to a method of programming a nonvolatile memory cell.

Description of Related Art

Nonvolatile memory (NVM) is widely applied in various electrical apparatus because it can retain information even no power is supplied thereto.

Generally, the nonvolatile memory may be implemented by floating gate transistors or anti-fuse transistors.

In terms of the NVM implemented by the floating gate transistors, by using a proper controlling mechanism, hot carriers may be injected into or ejected from the floating gate of the floating gate transistor. Consequently, the nonvolatile memory composed of floating gate transistors may be used as a multi-time programming memory.

While in terms of the NVM implemented by the anti-fuse transistors, the storage state of the anti-fuse transistor is determined according to the ruptured state of the gate oxide layer of the anti-fuse transistor. After the gate oxide layer is ruptured, the gate oxide layer fails to be recovered. Consequently, the nonvolatile memory composed of anti-fuse transistors may be used as a one-time programming memory.

However, in conventional way of operating the one-time programming memory, due to the variation of gate oxide integrity and gate oxide behavior after being ruptured, not only power is wasted, the chip reliability is also impacted.

SUMMARY

Accordingly, a method of programming a nonvolatile memory cell is provided in which power consumption is improved and the chip reliability is enhanced by providing a variable DC voltage source consisting of several parts.

A method of programming a nonvolatile memory cell according to an embodiment of the invention includes few steps. The nonvolatile memory cell includes a substrate; and a select transistor, a following gate transistor, and an anti-fuse transistor comprising a first gate oxide layer, disposed on the substrate and coupled in series with each other. The method includes: applying to said nonvolatile memory cell a variable DC voltage source comprising at least one high voltage part for forming a trapping path within the gate oxide and at least one low voltage part for crystallizing the trapping path into a silicon filament.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
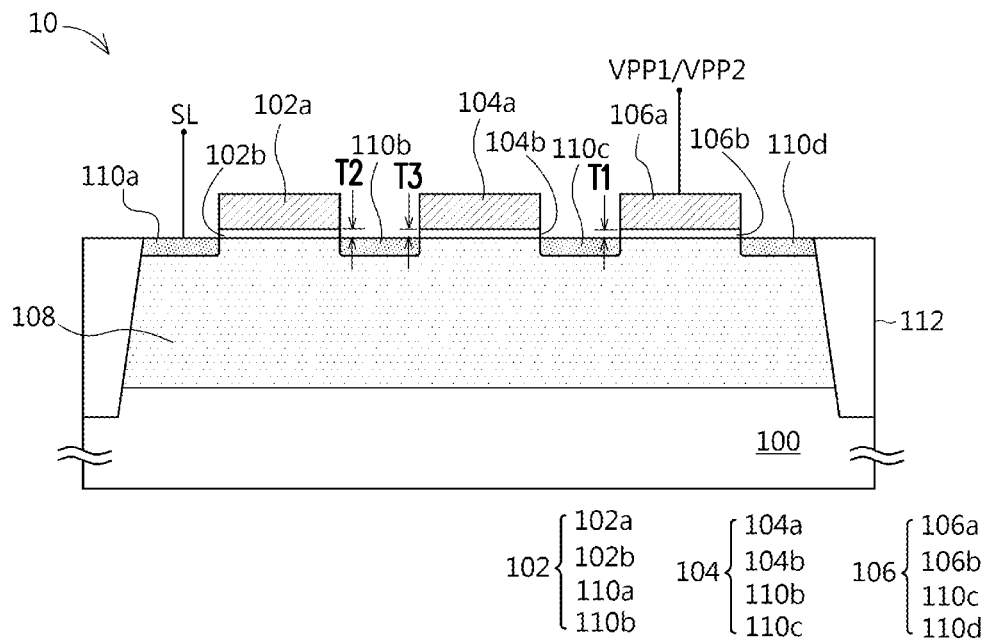
FIG. 1 is a schematic cross-sectional view illustrating a nonvolatile memory cell in accordance with an embodiment of this invention.

Reference will now be made in detail to the present preferred embodiments of the invention, examples of which are illustrated in the accompanying drawings. Wherever possible, the same reference numbers are used in the drawings and the description to refer to the same or like parts. In the figures, for clarity, each component and the relative size thereof may not be shown according to actual size.

FIG. 1 is a schematic cross-sectional view illustrating a nonvolatile memory cell in accordance with an embodiment of this invention.

With reference to FIG. 1, the nonvolatile memory cell 10 includes at least a substrate 100, a select transistor 102, a following gate transistor 104, and an anti-fuse transistor 106. The select transistor 102, the following gate transistor 104, and the anti-fuse transistor 106 are disposed on the substrate 100, and they are coupled in series with each other. For example, the select transistor 102, the following gate transistor 104, and the anti-fuse transistor 106 are all NMOS within a low voltage (LV) p type well 108 in the substrate 100, and each NMOS includes a gate, a low voltage (LV) gate oxide layer under the gate, and two n+ doped regions in the LV p type well 108 beside the gate. In particular, the select transistor 102 includes a select gate 102a, a second gate oxide layer 102b under the select gate 102a, and two doped regions 110a and 110b in the substrate 100 beside the select gate 102a; the following gate transistor 104 includes a following gate 104a, a third gate oxide layer 104b under the following gate 104a, and two doped regions 110b and 110c in the substrate 100 beside the following gate 104a; the anti-fuse transistor 106 includes an anti-fuse gate 106a, a first gate oxide layer 106b under the anti-fuse gate 106a, and two doped regions 110c and 110d in the substrate 100 beside the anti-fuse gate 106a. A select line SL is connected to the doped region 110a. The nonvolatile memory cell 10 is surrounded by an isolation structure 112 such as STI (Shallow Trench Isolation). In one embodiment, a thickness T3 of the third gate oxide layer 104b is equal to a thickness T2 of the second gate oxide layer 102b; alternatively, a thickness T1 of the first gate oxide layer 106b is equal to the thickness T2 of the second gate oxide layer 102b.

In one embodiment, the method of programming the nonvolatile memory cell 10 includes applying a variable DC voltage source to the nonvolatile memory cell 10, wherein the waveform pattern output from the variable DC voltage source includes at least one high voltage part and at least one low voltage part. Here, only one high voltage part VPP1 and one low voltage part VPP2 are shown as a simplified example.

Figure 2:
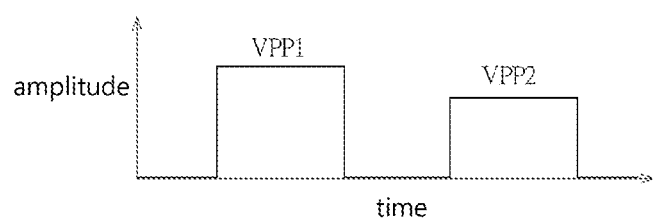
FIG. 2 is a waveform diagram illustrating shows a program operation in accordance with the embodiment of this invention.

With reference to FIG. 2, at the initial stage, a high voltage part VPP1 is applied to the anti-fuse gate 106a of the anti-fuse transistor 106, by doing so, a trapping path would be formed within the first gate oxide layer 106b under the anti-fuse gate 106a. Subsequently, a low voltage part VPP2 is also applied to the anti-fuse gate 106a of the anti-fuse transistor 106, by doing so, the trapping path would be crystallized into a silicon filament. During the programming, the select line SL is grounded.

In one embodiment, the amplitude of the low voltage part VPP2 is ¼ to ¾ time of the amplitude of the high voltage part VPP1; preferably, the amplitude of the low voltage part VPP2 is ⅔ time of the amplitude of the high voltage part VPP1. With such ratio, the program capability may be increased to achieve stably hard breakdown, resulting in enhancing cell performance.

In one embodiment, a duration of the high voltage part VPP1 is equal to that of the low voltage part VPP2. However, the present invention is not limited thereto. In another embodiment, the duration of the high voltage part VPP1 may be slightly different from that of the low voltage part VPP2. For example, the duration of the at least one high voltage part may be shorter than that of the at least one low voltage part; preferably, the ratio of the duration of the at least one high voltage part to the duration of the at least one low voltage part may be smaller than ½.

In yet another embodiment, the anti-fuse gate 106a, the first gate oxide layer 106b, and the well region 108 may together serve as a capacitor before programming. After programming, the anti-fuse gate 106a, the first gate oxide layer 106b, and the well region 108 together serve as a resistor. Preferably, the thickness T1 of the first gate oxide layer 106b is thin enough to be easily ruptured by the predetermined high voltage part as VPP1.

In summary, the program operation according to the present invention can improve the power consumption and enhance the chip reliability by using a variable DC voltage source.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of programming a nonvolatile memory cell having a substrate; and a select transistor, a following gate transistor, and an anti-fuse transistor comprising a first gate oxide layer, disposed on the substrate and coupled in series with each other, the method comprising:
applying to said nonvolatile memory cell a variable DC voltage source comprising at least one high voltage part for forming a trapping path within the first gate oxide layer and at least one low voltage part for crystallizing the trapping path into a silicon filament, wherein a duration of the at least one high voltage part is shorter than a duration of the at least one low voltage part, and the ratio of the duration of the at least one high voltage part to the duration of the at least one low voltage part is smaller than ½.

2. The method of programming a nonvolatile memory cell according to claim 1, wherein the anti-fuse transistor is a capacitor.

3. The method of programming a nonvolatile memory cell according to claim 1, wherein the select transistor comprises a second gate oxide layer, the following gate transistor comprises a third gate oxide layer, wherein a thickness of the third gate oxide layer is equal to that of the second gate oxide layer.

4. The method of programming a nonvolatile memory cell according to claim 1, wherein the select transistor comprises a second gate oxide layer, a thickness of the first gate oxide layer is equal to that of the second gate oxide layer.

5. The method of programming a nonvolatile memory cell according to claim 1, wherein an amplitude of the at least one low voltage part is ¼ to ¾ time of an amplitude of the at least one high voltage part.

6. The method of programming a nonvolatile memory cell according to claim 1, wherein an amplitude of the at least one low voltage part is ⅔ time of an amplitude of the at least one high voltage part.

* * * * *